United States Patent [19]

Bockrath et al.

[11] Patent Number: 4,708,806

[45] Date of Patent: Nov. 24, 1987

[54] DESTRUCTION OF NITRATED AROMATICS

[75] Inventors: Richard E. Bockrath, Wilmington; Kirby Kirksey, Newark, both of Del.

[73] Assignee: E. I. Du Pont de Nemours and Company, Wilmington, Del.

[21] Appl. No.: 625,908

[22] Filed: Jun. 29, 1984

[51] Int. Cl.$^4$ ............................ C02F 1/72; C02F 1/76
[52] U.S. Cl. ................................ 210/754; 210/758; 210/909
[58] Field of Search ................................ 568/927–940, 568/706, 708, 712, 716; 423/358, 351; 260/688, 689, 687 R; 210/754, 758, 909; 564/416, 418

[56] References Cited

U.S. PATENT DOCUMENTS

| | | | |
|---|---|---|---|
| 1,492,094 | 4/1924 | Bielouss | 564/416 |
| 1,574,337 | 2/1926 | Bogert | 564/416 |
| 1,793,942 | 2/1931 | Laux | 564/416 |
| 1,845,759 | 2/1932 | Miller | 564/416 |
| 2,487,627 | 11/1949 | Aitken et al. | 210/754 |
| 2,614,126 | 10/1952 | Krueger | 564/416 |
| 2,684,383 | 7/1954 | Krueger | 564/416 |
| 3,221,069 | 11/1965 | Bain et al. | 568/928 |
| 3,617,581 | 11/1971 | Wang et al. | 210/909 |
| 3,636,101 | 1/1972 | Doumani | 568/927 |
| 3,689,576 | 9/1972 | Bachman et al. | 568/927 |
| 4,194,973 | 3/1980 | Smith. | |
| 4,197,198 | 4/1980 | Watson et al. | 210/754 |
| 4,219,419 | 8/1980 | Sweeny. | |
| 4,310,500 | 1/1982 | Langecker et al. | 568/927 |
| 4,321,143 | 3/1987 | Wilms et al. | |
| 4,415,461 | 11/1983 | Mansel et al. | 210/757 |
| 4,479,904 | 10/1984 | Lilje | 260/465 E |
| 4,604,214 | 8/1986 | Carr et al. | 210/909 |

FOREIGN PATENT DOCUMENTS

| | | | |
|---|---|---|---|
| 3015243 | 7/1981 | Fed. Rep. of Germany | 210/754 |
| 56-36994 | 2/1975 | Japan | 210/757 |

OTHER PUBLICATIONS

CA 93:204174q, "Use of Activated Iron Powder as a Reducing Agent in Organic Reactions".
CA 88: 152,212a, "Semicontinuous Manufacture of Aromatic Amines".
Groggins, P. H., *Unit Processes in Organic Synthesis*, 5th Edition, McGraw-Hill Book Company, New York, New York, 1958, pp. 135–145.

*Primary Examiner*—Deborah L. Kyle
*Assistant Examiner*—T. J. Wallen
*Attorney, Agent, or Firm*—Craig H. Evans

[57] ABSTRACT

A process for destroying nitrated aromatics, e.g., the nitrophenol byproducts produced in the nitration of benzene to dinitrobenzene, is disclosed. The process involves treatment of an aqueous solution of the nitrated aromatics with iron and hydrochloric acid with or without ferric chloride using 0.2 to 7 molecular equivalents of finely divided iron based on the organic nitro groups present. The reaction is carried out at 0° to 100° C. and pH 1.5–3.

6 Claims, No Drawings

DESTRUCTION OF NITRATED AROMATICS

BACKGROUND OF THE INVENTION

1. Field of the Invention

The present invention relates to a process for destroying nitrated aromatics and particularly the nitrophenols produced in the nitration of benzene to form dinitrobenzene. The process involves treating the nitrated aromatics, e.g., nitrophenols which have been extracted from dinitrobenzene as a dilute aqueous salt solution, with finely divided iron and hydrochloric acid with or without ferric chloride.

2. Prior Art

Groggins, P. H., *Unit Processes in Organic Synthesis*, 5th Edition, McGraw-Hill Book Company, New York, N.Y. 1958, pages 135–145, discloses the use of iron metal and hydrochloric acid to reduce nitrobenzene to aniline.

DETAILED DESCRIPTION

The process of the invention is useful for the destruction of nitrated aromatics, e.g., aniline, nitrobenzene, and nitrophenols. Since the process is particularly useful for the destruction of nitrophenols, the following description is directed mainly to that embodiment. It should be understood that the process is not so limited and to other nitrated aromatics, such as set forth in Examples 3 and 4, can be treated by the process.

The nitration of benzene to dinitrobenzene produces nitrophenols of the formula

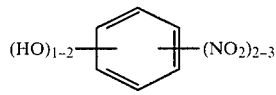

which principally are styphnic acid, i.e., 1,3-dihydroxy-2,4,6-trinitrobenzene and picric acid, i.e., 2,4,6-trinitrophenol. These nitrophenols are readily removed from the nitration reaction product stream by treatment with a basic aqueous wash, resulting in a colored solution. Generally the resulting aqueous solution will contain 0.5 to 10 percent by weight and preferably 1.5 to 2.5 percent by weight of nitrophenols. Ammonium hydroxide is the preferred base for basifying the aqueous wash stream, but other bases such as the alkali metal hydroxides can be used.

During the reaction of the present invention acid should be added to the aqueous wash to maintain the pH between 1.5 and 3 and preferably between 2 and 2.5. Below pH 1.5 excessive gas evolution from the reactor occurs. Above pH 3 the reaction becomes unduly slow. The acid used to control the pH is hydrochloric acid or a mixture of hydrochloric acid and ferric chloride. The ferric chloride can come from an iron chloride solution, e.g., a mixture of ferric/ferrous chloride.

The hydrochloric acid reacts with iron to produce hydrogen which theoretically would reduce the nitro groups on the nitrophenols to amine groups. Surprisingly, it has been found that the organic materials present are essentially destroyed and at the end of the reaction essentially no organic materials are present in the reaction medium as determined by colormetric analysis or nmr spectroscopy. The nitro groups are reduced to nitrogen or oxided to $NO_x$ and the aromatic ring changed to $CO_2$ and organic fragments.

The reaction with other nitrated organics may not be as complete, i.e., when the process is employed with nitrobenzene, dinitrobenzene, aniline, not all of the aromatic structure is destroyed.

The amount of iron used, based on the organic nitro groups present, will range from 0.2 to 7 molecular equivalents. The preferred range is from 1 to 1.3 molecular equivalents since above about 2.5, no significant improvement in the process is noted. The amount of iron does effect reaction rate, thus, excess iron reduces reaction time.

The iron used should be finely divided, by that it is meant small enough to pass a 10 mesh screen (U.S. sieve series). Preferably the iron will pass a 40 mesh screen and be retained on 80 mesh.

Generally the reaction requires from 2 to 60 hours for completion, the higher the temperature, the faster the reaction. The end point can be determined by colormetric methods or nmr spectroscopy.

Generally the reaction is carried out at from 0° to 100° C. Below about 20° C. the reaction is markedly slower and below 0° C. is unacceptably slow.

The process can be operated in the batch or continuous mode. The use of agitation improves reaction rate.

Urea can be added to the process to reduce $NO_x$ evolution if such becomes a problem. Generally from 10 to 60 weight percent, based on nitrophenols present, of urea is added to the system.

EXAMPLES

EXAMPLE 1

A vessel was charged with 340,000 lbs. (154,545 Kg) of aqueous waste extracted from the product resulting in the production of dinitrobenzene from benzene and nitric acid. The aqueous waste was extracted using an ammoniacal aqueous wash. The aqueous waste was at pH 9 and contained about 1% by weight ammonia and 2% by weight nitrated organics of which 1.5% by weight were nitrated phenols which were principally styphnic acid and picric acid in a weight ratio of 1.5 styphnic acid to 1.0 picric acid.

The pH of the aqueous waste was lowered to 2 using a 50/50 30% aqueous HCl/30% aqueous $FeCl_3$ mixture while adding 24,000 lbs. (10,909 Kg) finely divided iron. The reaction temperature was maintained at 40±10° C. and the pH at 2±0.5. After 50 hours the color of the reaction mixture was reduced from 1000 APHA units to 200 APHA units. Nuclear magnetic resonance spectroscopy indicated that there were no organic species present. The remaining color was due to solubilized iron. An APHA unit is a color unit based on the American Public Health Association recommended standard of one color unit being equal to 1 mg/1 platinum as chloroplatinate ion.

EXAMPLE 2

A 500 ml glass beaker was charged with 200 ml of the aqueous waste described in Example 1. The contents of the beaker were heated to and maintained at 50° C. over the entire reaction period. Finely divided iron powder was added to the beaker in an amount 2.2 times the amount needed to reduce the nitro groups on the organic acids present. The pH was adjusted to 2.0 and maintained at 2.0 during the entire reaction period using 30% hydrochloric acid. After 50 hours the reaction was shut down and no organic material was found in the reaction mixture.

EXAMPLE 3

A 500 ml glass beaker was charged with 196 ml of water and 4 grams of aniline. The contents of the beaker were heated to and maintained at 55° C. over a 20 hour reaction period. Finely divided iron powder was added to the beaker in the amount of 12.0 grams. The pH was adjusted to 2.0 and maintained at 2.0 during the entire reaction period using 30% hydrochloric acid. Analysis of the reaction mixture was based on total organic carbon (TOC). The initial analysis indicated 15.3 g TOC/liter (3.95 g aniline/200 ml of reaction mixture) while the final analysis indicated 7.19 g TOC/liter or a 53% destruction of the organic.

EXAMPLE 4

A 500 ml glass beaker was charged with 196 ml of water and 4 grams of nitrobenzene. The contents of the beaker were heated to and maintained at 55° C. over a 20 hour reaction period. Finely divided iron powder was added to the beaker in the amount of 9.2 grams. The pH was adjusted to 2.0 and maintained at 2.0 during the entire reaction period using 30% hydrochloric acid. Analysis of the reaction mixture was based on total organic carbon (TOC). The initial analysis indicated 11.6 g/liter (3.96 g nitrobenzene/200 ml of reaction mixture) while the final analysis indicated 1.07 g TCC/liter or a 91% destruction of the organic.

We claim:

1. A process for destroying nitrated aromatics by breaking the ring structure comprising treating at 0° to 100° C. for 2 to 60 hours an aqueous solution containing 0.5 to 10 percent by weight of said nitrated organics with 0.2 to 7 molecular equivalents, based on organic nitro group, of finely divided iron particles while maintaining the pH of the solution at 1.5 to 3 through addition of hydrochloric acid or a mixture of hydrochloric acid and ferric chloride.

2. A process for destroying nitrophenols of the formula

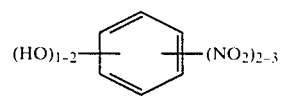

comprising treating at 0° to 100° C. for 2 to 60 hours until the ring structure of the nitrophenols is broken, an aqueous solution containing 0.5 to 10 percent by weight of said nitrophenols with 0.2 to 7 molecular equivalents, based on the organic nitro group, of finely divided iron particles while maintaining the pH of the solution at 1.5 to 3 through addition of hydrochloric acid or a mixture of hydrochloric acid and ferric chloride.

3. The process of claim 2 wherein the nitrophenol is a mixture of styphnic and picric acids.

4. The process of claim 2 wherein the pH is maintained at 2 to 2.5.

5. The process of claim 2 wherein 10 to 60 percent by weight, based on nitrophenols present, of urea is added.

6. The process of claim 2 wherein 1 to 1.3 molecular equivalents of finely divided iron is employed.

* * * * *